(12) United States Patent
Hashimoto et al.

(10) Patent No.: US 11,750,753 B2
(45) Date of Patent: Sep. 5, 2023

(54) IMAGE READING DEVICE, IMAGE FORMING APPARATUS, AND IMAGE READING METHOD

(71) Applicants: Hideki Hashimoto, Tokyo (JP);
Daisuke Nikaku, Kanagawa (JP);
Yutaka Ohmiya, Tokyo (JP)

(72) Inventors: Hideki Hashimoto, Tokyo (JP);
Daisuke Nikaku, Kanagawa (JP);
Yutaka Ohmiya, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/695,838

(22) Filed: Mar. 16, 2022

(65) Prior Publication Data

US 2022/0303417 A1 Sep. 22, 2022

(30) Foreign Application Priority Data

Mar. 17, 2021 (JP) ................. 2021-043349

(51) Int. Cl.
*H04N 1/00* (2006.01)
*H04N 1/12* (2006.01)

(52) U.S. Cl.
CPC ....... *H04N 1/00761* (2013.01); *H04N 1/0057* (2013.01); *H04N 1/00801* (2013.01); *H04N 1/121* (2013.01); *H04N 2201/0094* (2013.01)

(58) Field of Classification Search
CPC .. H04N 1/02815; H04N 1/4097; H04N 1/488; H04N 1/58; H04N 2201/0094;

(Continued)

(56) References Cited

U.S. PATENT DOCUMENTS 11,223,768 B2 * 1/2022 Ohmiya ............. H04N 1/00702
2002/0131649 A1 * 9/2002 Yamaguchi ............... G06T 5/50
250/341.8

(Continued)

FOREIGN PATENT DOCUMENTS

JP 2012-239114 12/2012
JP 2020-028102 2/2020
JP 2020-106862 7/2020

OTHER PUBLICATIONS

Extended European Search Report dated Jun. 7, 2022 in European Patent Application No. 22162261.6, 10 pages.

*Primary Examiner* — Negussie Worku
(74) *Attorney, Agent, or Firm* — XSENSUS LLP

(57) ABSTRACT

An image reading device includes a reading unit, a background member, and processing circuitry. The reading unit includes alight source to emit light to a passage area through which an object passes and an imaging device to capture reflected light of the light emitted to generate a visible image and an invisible image. The background member is disposed opposite the light source across the passage area. The processing circuitry is configured to: detect a change in an image characteristic due to a change in an optical characteristic of the reading unit, in invisible images obtained by capturing of invisible marks on the background member; determine a correction amount of an image characteristic to be used for correcting an image of the object generated by the imaging device, based on the change in the image characteristic detected; and correct the image characteristic based on the correction amount determined.

19 Claims, 13 Drawing Sheets

(58) Field of Classification Search
CPC ............. H04N 1/0087; H04N 1/40093; H04N 1/1013; H04N 5/332; H04N 1/00798; H04N 1/00082; H04N 1/00127; H04N 1/00129; H04N 1/00331; H04N 1/0461; H04N 1/19515; H04N 1/40056; H04N 1/00037; H04N 1/00795; H04N 1/00846; H04N 1/02845; H04N 1/02885; H04N 1/193; H04N 1/38; H04N 1/401; H04N 1/4446; H04N 1/484; H04N 1/6072; H04N 5/217; H04N 5/2258; H04N 5/33; H04N 5/3694; H04N 1/00002; H04N 1/00005; H04N 1/00034; H04N 1/00047; H04N 1/00053; H04N 1/00058; H04N 1/00241; H04N 1/00326; H04N 1/04; H04N 1/32128; H04N 1/46; H04N 1/6002; H04N 2201/0408; G06T 2207/10048; G06T 2207/20192; G06T 2207/30176; G06T 5/003; G06T 5/005; G06T 5/20; G06T 5/50; G06T 7/11; G06K 2207/1011; G06K 7/0004; G06K 7/10732; G06K 7/10752; G06K 7/10841; G06K 7/10851; G06K 7/1093; G06K 7/1404; G06K 9/00

USPC ........................................................ 358/474
See application file for complete search history.

(56) References Cited

U.S. PATENT DOCUMENTS

| | | | |
|---|---|---|---|
| 2012/0057210 A1* | 3/2012 | Tsukahara | H04N 1/00013 358/461 |
| 2016/0003673 A1 | 1/2016 | Hashimoto et al. | |
| 2017/0223223 A1 | 8/2017 | Netsu | |
| 2018/0048788 A1* | 2/2018 | Hayashi | H04N 1/6033 |
| 2018/0084145 A1* | 3/2018 | Isokawa | H04N 1/393 |
| 2018/0139345 A1 | 5/2018 | Goh et al. | |
| 2019/0238702 A1 | 8/2019 | Ikemoto et al. | |
| 2019/0238717 A1 | 8/2019 | Inage et al. | |
| 2019/0327387 A1 | 10/2019 | Hashimoto et al. | |
| 2020/0053230 A1 | 2/2020 | Nakazawa et al. | |
| 2021/0014441 A1 | 1/2021 | Ohmiya et al. | |
| 2021/0168253 A1* | 6/2021 | Nakayama | H04N 1/0071 |
| 2021/0385384 A1* | 12/2021 | Ohmiya | H04N 1/0057 |
| 2021/0400159 A1* | 12/2021 | Oyama | H04N 1/486 |
| 2021/0409566 A1* | 12/2021 | Hashimoto | H04N 1/00037 |
| 2022/0182509 A1* | 6/2022 | Nomura | H04N 1/00249 |

* cited by examiner

IMAGE READING DEVICE, IMAGE FORMING APPARATUS, AND IMAGE READING METHOD

CROSS-REFERENCE TO RELATED APPLICATION

This patent application is based on and claims priority pursuant to 35 U.S.C. § 119(a) to Japanese Patent Application No. 2021-043349, filed on Mar. 17, 2021, in the Japan Patent Office, the entire disclosure of which is hereby incorporated by reference herein.

BACKGROUND

Technical Field

Embodiments of the present disclosure relate to an image reading device, an image forming apparatus, and an image reading method.

Related Art

In an image reading device that reads an image of a document or the like, a method is known that forms a pattern image on a backing roller and cuts out a document image based on a shadow image and the pattern image extracted from a captured image. For example, setting the pattern image of the backing roller as an invisible image can prevent an unnecessary image pattern from being captured in the document image.

In addition, a method is known that: in response to a detection of a temperature change equal to or greater than a predetermined value, switches a background surface facing a reading unit to a correction surface on which a chart image is formed; reads the chart image; and calculates a correction magnification for each partial region of the image.

SUMMARY

According to an embodiment of the present disclosure, there is provided an image reading device that includes a reading unit, a background member, and processing circuitry. The reading unit includes a light source and an imaging device. The light source emits light to a passage area through which an object passes. The imaging device captures reflected light of the light emitted from the light source to generate a visible image and an invisible image. The background member is disposed opposite the light source across the passage area. The background member has invisible marks identifiable as invisible images by the imaging device. The processing circuitry is configured to: detect a change in an image characteristic due to a change in an optical characteristic of the reading unit, in the invisible images obtained by capturing of the invisible marks; determine a correction amount of an image characteristic to be used for correcting an image of the object generated by the imaging device, based on the change in the image characteristic detected; and correct the image characteristic based on the correction amount determined.

In another embodiment of the present disclosure, there is provided an image forming apparatus that includes the image reading device.

In still another embodiment of the present disclosure, there is provided an image reading method to be performed by an image reading device that includes: a reading unit, including a light source and an imaging device; and a background member disposed opposite the light source across a passage area through which an object passes. The method includes emitting, capturing, detecting, determining, and correcting. The emitting emits light from the light source to the passage area. The capturing captures, with the imaging device, reflected light of the light emitted from the light source to generate a visible image and an invisible image. The detecting detects a change in an image characteristic due to a change in an optical characteristic of the reading unit in invisible images obtained by capturing of invisible marks of the background member. The determining determines a correction amount of an image characteristic to be used for correcting an image of the object generated by the imaging device, based on the change in the image characteristic detected. The correcting corrects the image characteristic based on the correction amount determined.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
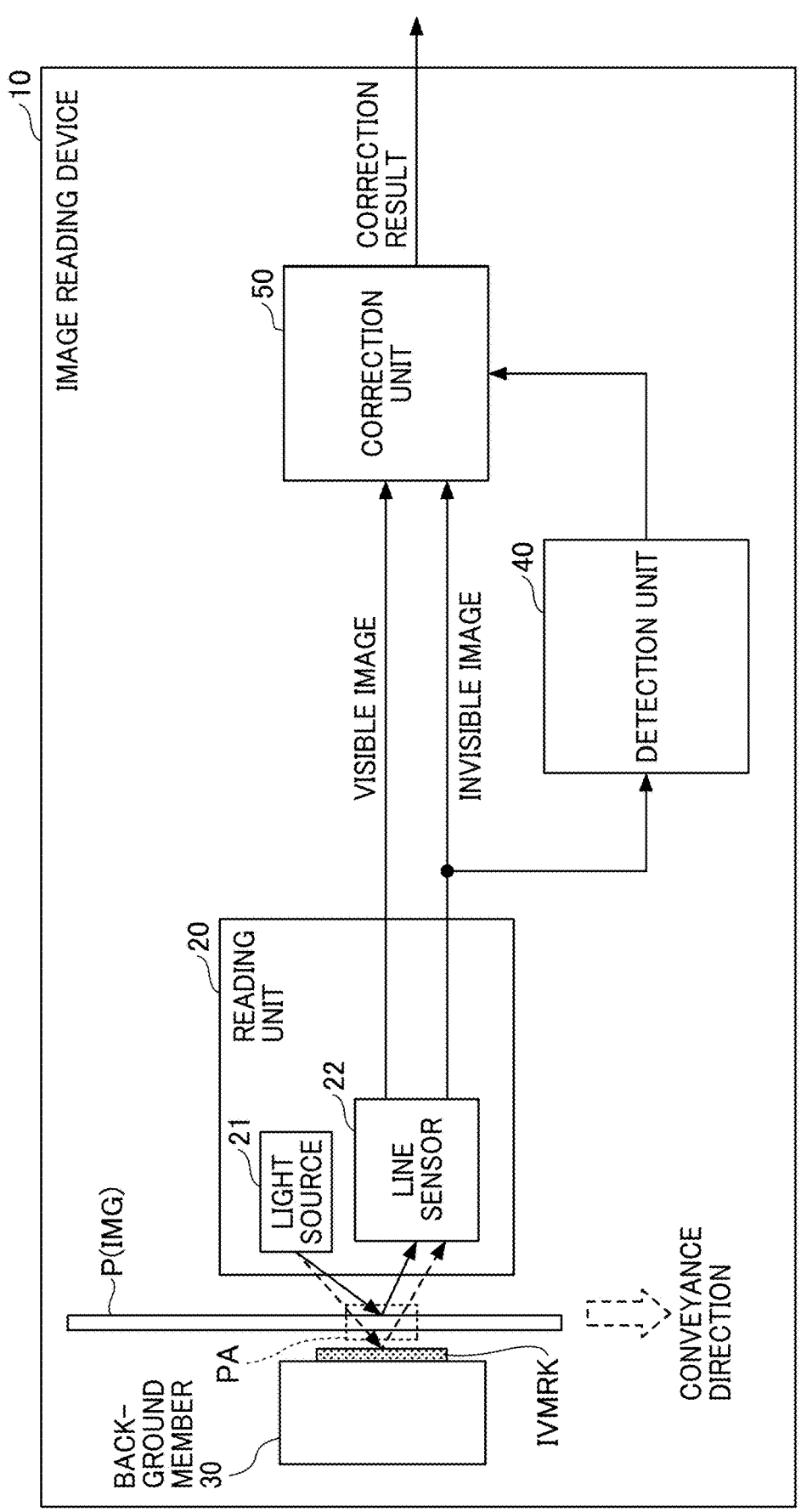
FIG. 1 is a block diagram illustrating an image reading device according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments are described with reference to the drawings. In each drawing, the same configuration shares the same reference numeral and the overlapped description is omitted.

First Embodiment of Image Reading Device

FIG. 1 is a block diagram illustrating an image reading device according to a first embodiment of the present disclosure. An image reading device 10 illustrated in FIG. 1 includes a reading unit 20, a background member 30, a detection unit 40, and a correction unit 50. For example, the reading unit 20 includes a light source 21 and a line sensor 22.

The light source 21 emits light including visible light and invisible light to a passage area PA through which a sheet of paper (hereinafter, simply a sheet) P on which an object such as an image is formed passes. For example, the invisible light is light in a near-infrared region. Note that the object is not limited to an image on the sheet P, and may be an image printed on a resin such as a film, a metal, or the like, or may be an uneven pattern formed on the sheet P or the like. In the following description, it is assumed that the object is an image on the sheet P.

The line sensor 22 can capture reflected light of the light emitted from the light source 21 to generate a visible image and an invisible image. For example, when the sheet P is moved along a conveyance direction and positioned in the passage area PA, the line sensor 22 captures an image of reflected light from the sheet P. When the sheet P is not positioned in the passage area PA, the line sensor 22 captures an image of reflected light from the background member 30. The line sensor 22 is an example of an imaging device.

The background member 30 is disposed on the side opposite to the light source 21 and the line sensor 22 across the passage area PA. The background member 30 has an invisible mark IVMRK that can be identified as an invisible image by the line sensor 22. The invisible mark IVMRK is detected as reflection light of light from the light source 21 by pixels of the line sensor 22 that detect invisible light. Examples of the invisible mark IVMRK are described with reference to FIG. 2 and the subsequent drawings.

For example, the background member 30 is formed using glass or a ceramic material having a thermal expansion coefficient smaller than those of resin and metal. Thus, the amount of expansion and contraction of the distance between the invisible marks IVMRK due to a temperature change of the background member 30 can be reduced compared to a background member made of resin or metal. As a result, the background member 30 can reduce a decrease in the accuracy of correction of a visible image and an invisible image due to a temperature change.

On the other hand, in a background member formed of resin or metal, the expansion and contraction rate due to heat is larger than the expansion and contraction rate of the background member 30. Thus, the expansion and contraction amount of the interval between the invisible marks IVMRK due to a temperature change is larger than that of the background member 30. This reduces the accuracy of the correction of the visible image.

The detection unit 40 detects a change in image characteristics due to a change in optical characteristics of the reading unit 20 in an invisible image obtained by capturing the invisible mark of the background member 30. Examples of a change in optical characteristics of the reading unit 20 include a change in brightness or color of the light source 21 due to a temperature change of the image reading device 10, deformation of a lens and a mirror, and expansion and contraction of the line sensor 22.

The correction unit 50 determines a correction amount of the image characteristics used for correcting the image on the sheet P captured by the line sensor 22 based on the change in the image characteristics detected by the detection unit 40, and corrects the image characteristics based on the determined correction amount. For example, the correction unit 50 determines the correction amount of an image characteristic used for correcting visible image data generated by the line sensor 22 corresponding to a visible image on the sheet P. Alternatively, the correction unit 50 determines the correction amount of an image characteristic used for correcting invisible image data generated by the line sensor 22 corresponding to an invisible image on the sheet P. Further, the correction unit 50 may determine the correction amount of an image characteristic used for correcting each of the visible image data and the invisible image data. Hereinafter, the image data may be simply referred to as an image.

The correction unit 50 outputs the corrected image characteristics as a correction result. A subsequent mechanism that receives the correction result corrects at least one of the visible image and the invisible image of the sheet P based on the corrected image characteristics.

The detection unit 40 and the correction unit 50 may be implemented by a controller such as a central processing unit (CPU) mounted in the image reading device 10 executing an image reading program or an image correction program. Alternatively, the detection unit 40 and the correction unit 50 may be implemented by a field-programmable gate array (FPGA) or the like mounted in the image reading device 10.

Figure 2:
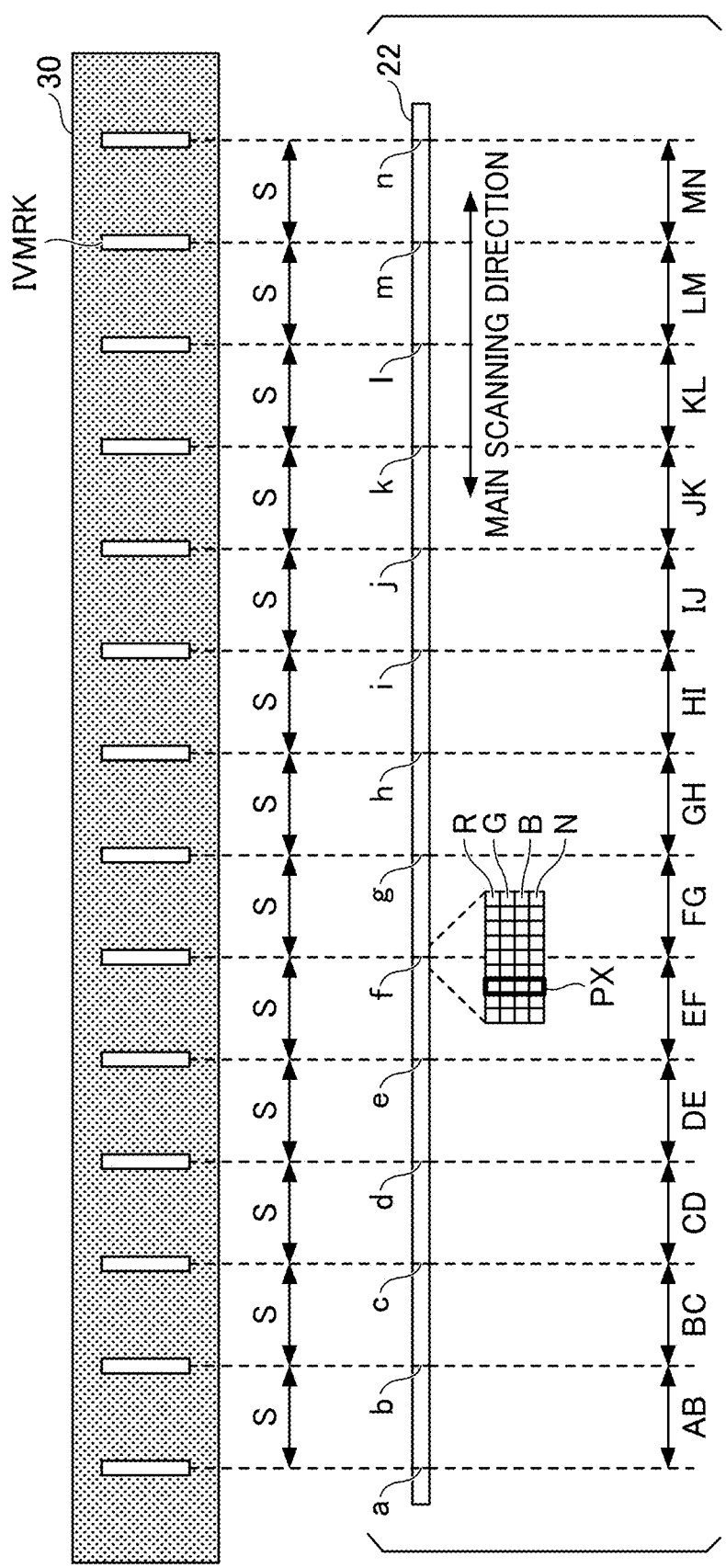
FIG. 2 is a diagram illustrating an example of invisible marks formed on a background member of FIG. 1.

FIG. 2 is a diagram illustrating an example of invisible marks IVMRK formed on the background member 30 of FIG. 1. The invisible marks IVMRK are formed at intervals S along the longitudinal direction of the elongated background member 30 extending in the horizontal direction of FIG. 2. In FIG. 2, fourteen invisible marks IVMRK are illustrated. However, the number of invisible marks IVMRK is not limited to fourteen and may be any other number as long as the number is two or more. The invisible marks IVMRK are an example of figures arranged at predetermined intervals along one direction (main scanning direction) in the background member 30.

For example, the invisible mark IVMRK is provided at a position corresponding to a pixel PX of the line sensor 22. For example, the line sensor 22 includes four photoelectric conversion elements that detect red light R, green light G, blue light B, and near-infrared light N, respectively, and are arranged in a direction (vertical direction in FIG. 2) orthogonal to the main scanning direction of the line sensor 22. The four photoelectric conversion elements form one pixel PX. The line sensor 22 detects visible light and invisible light by each of the plurality of pixels PX arranged in the main scanning direction. Hereinafter, the photoelectric conversion elements that detect red R, green G, and blue B are also referred to as an R pixel, a G pixel, and a B pixel, respectively. A photoelectric conversion element that detects near-infrared light N is also referred to as an N pixel. In addition, in the following description, the pixels PX are also referred to as pixels a to n when the positions are distinguished and described.

Reflection light (invisible light) from the invisible marks IVMRK is detected by the pixels a to n arranged at equal intervals in the main scanning direction of the line sensor 22. However, due to a change in the optical characteristics of the reading unit 20, the physical positions of the pixels a to n (the positions of the pixels PX) that detect the invisible marks IVMRK change.

In the following, the interval between two invisible marks IVMRK corresponding to the pixels a and b is referred to as an interval AB or a region AB, and the interval between two invisible marks IVMRK corresponding to the pixels b and c is referred to as an interval BC or a region BC. The same applies to intervals CD, DE, EF, FG, GH, HI, IJ, JK, KL, LM, and MN.

Figure 3:
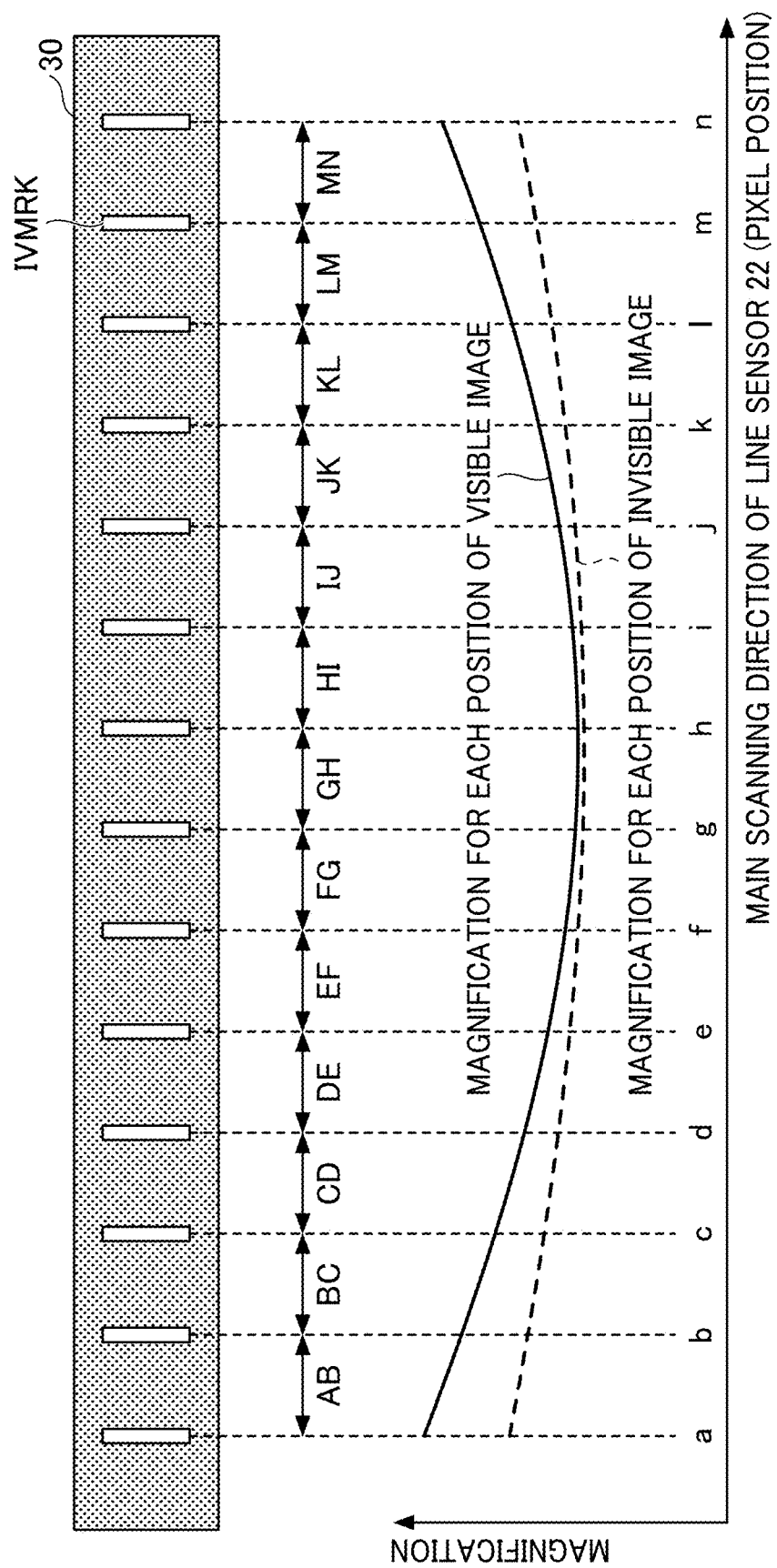
FIG. 3 is a diagram illustrating an example of the correspondence between invisible images and visible images of FIG. 2.

FIG. 3 is a diagram illustrating an example of the correspondence between the invisible image and the visible image in FIG. 2. Hereinafter, an invisible image of the invisible mark IVMRK captured by the line sensor 22 is also referred to as an invisible mark image.

As described in FIG. 2, a visible image is detected by the R pixel, the G pixel, and the B pixel, and an invisible image is detected by the N pixel. Light of the visible image and light of the invisible image received by the line sensor 22 have different wavelengths. Since the positions of the R pixel, the G pixel, the B pixel, and the N pixel are different from each other, for example, light receiving characteristics of lenses disposed on the light receiving surface of the line sensor 22 in FIG. 1 are slightly different from each other. The light receiving characteristics of the lens also change due to deformation of the lens caused by temperature.

For this reason, the visible image and the invisible image are different in magnification that is a correction amount of an image. For example, the magnification is used to correct the length in the main scanning direction. The magnifications of the visible image and the invisible image are different from each other depending on not only the difference in the positions of pixels but also the differences in the wavelength and the light-receiving characteristic of the lens. However, the tendency of the change of the magnification in the main scanning direction is the same between the visible image and the invisible image.

Therefore, in this embodiment, the ratio of the magnification of the visible image to the magnification of the invisible image is calculated based on the interval between the invisible mark images detected by the detection unit 40, and is used as the correction amount of the image characteristics used for the correction of the visible image. An example of calculating the correction amount of the image characteristics is described with reference to FIG. 4.

Figure 4:
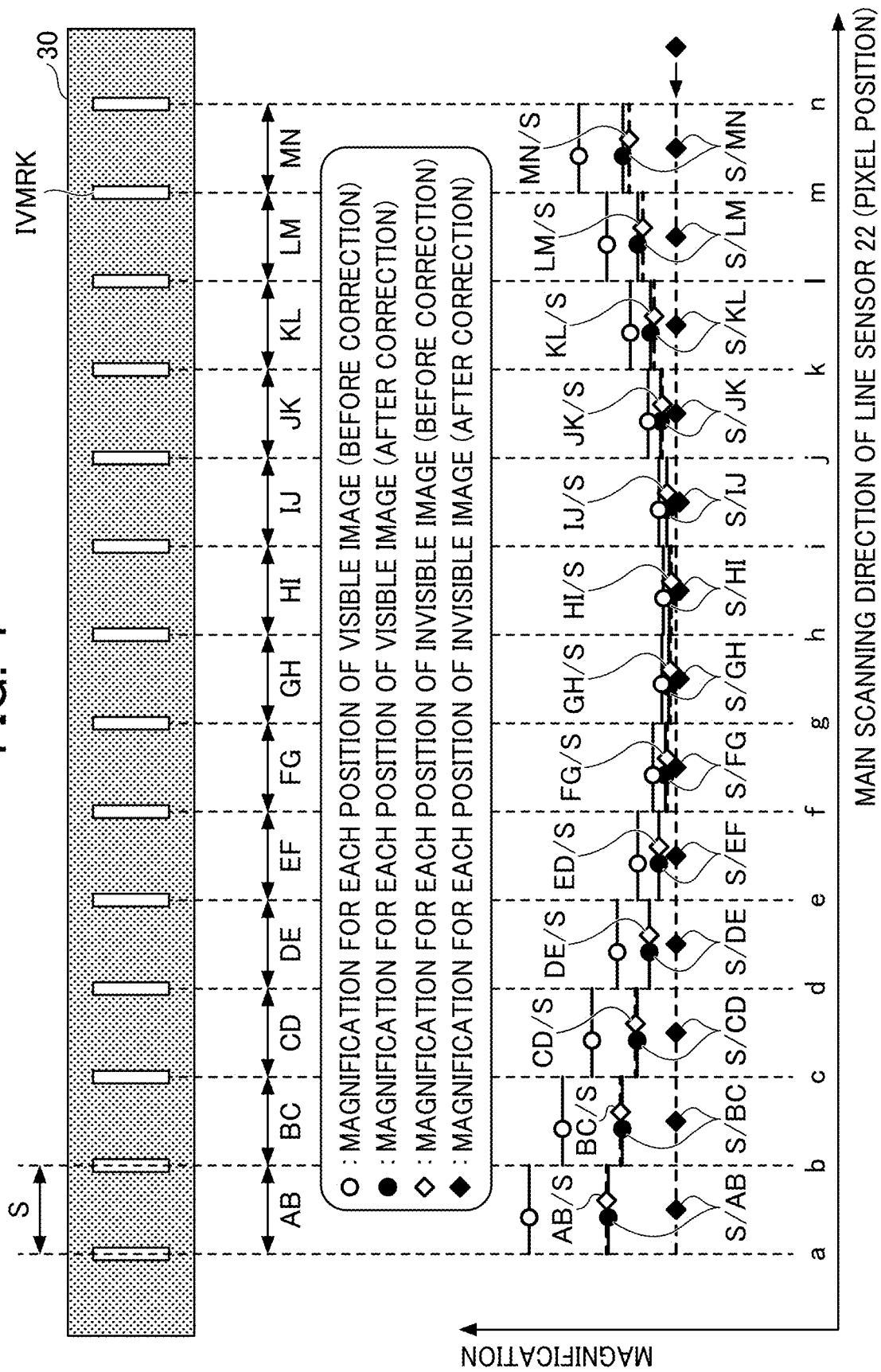
FIG. 4 is a diagram illustrating an example of correcting visible images by the image reading device illustrated in FIG. 1.

FIG. 4 is a diagram illustrating an example of correcting a visible image by the image reading device 10 illustrated in FIG. 1. For example, the detection unit 40 of FIG. 1 detects the interval AB between two invisible marks IVMRK corresponding to the region AB as a change in image characteristics based on invisible mark images captured by the line sensor 22.

The detection unit 40 calculates a ratio S/AB of the interval S of two invisible marks IVMRK to the interval AB. The interval S is a unique value determined at the time of manufacturing the background member 30 and is, for example, an interval (a design value or the like) between the invisible marks IVMRK at a standard temperature (for example, 25° C.). Note that a ratio AB/S indicated by a white diamond indicates a change rate of the interval AB with respect to the interval S, the change rate being caused by a temperature change. The ratios BC/S, CD/S, ..., and MN/S of the other intervals BC, CD, ..., and MN each also indicate the change rate of each interval with respect to the interval S changed by the temperature change.

The correction unit 50 determines the ratio S/AB of the invisible mark image calculated by the detection unit 40 as the correction amount of the image characteristic used for correcting the visible image present in the area AB. The correction unit 50 determines the ratio S/AB of the invisible mark image calculated by the detection unit 40 as the correction amount of the image characteristic used for correcting the invisible image present in the area AB. For example, an image correction unit connected to the subsequent stage of the correction unit 50 multiplies at least one of the visible image and the invisible image of the area AB by S/AB in the main scanning direction to correct the image.

The detection unit 40 also calculates the ratios S/BC, S/CD, ..., and S/MN for the other regions BC, CD, ..., and MN, respectively. The correction unit 50 determines the ratios S/BC, S/CD, ..., and S/MN as correction amounts of the image characteristics used for correcting the invisible image and the visible image in the respective regions BC, CD, ..., and MN. Correcting the visible image using the correction amount based on the ratio allows generation of a visible image in which a change in the magnification of each part of the image due to a temperature change is reduced, thus allowing enhancement of the accuracy of the image. In addition, correcting the invisible image using the correction amount based on the ratio allows elimination of a change in magnification of each part of the image due to a temperature change and generation of an invisible image in a state equivalent to that in a case where there is no temperature change.

Figure 5:
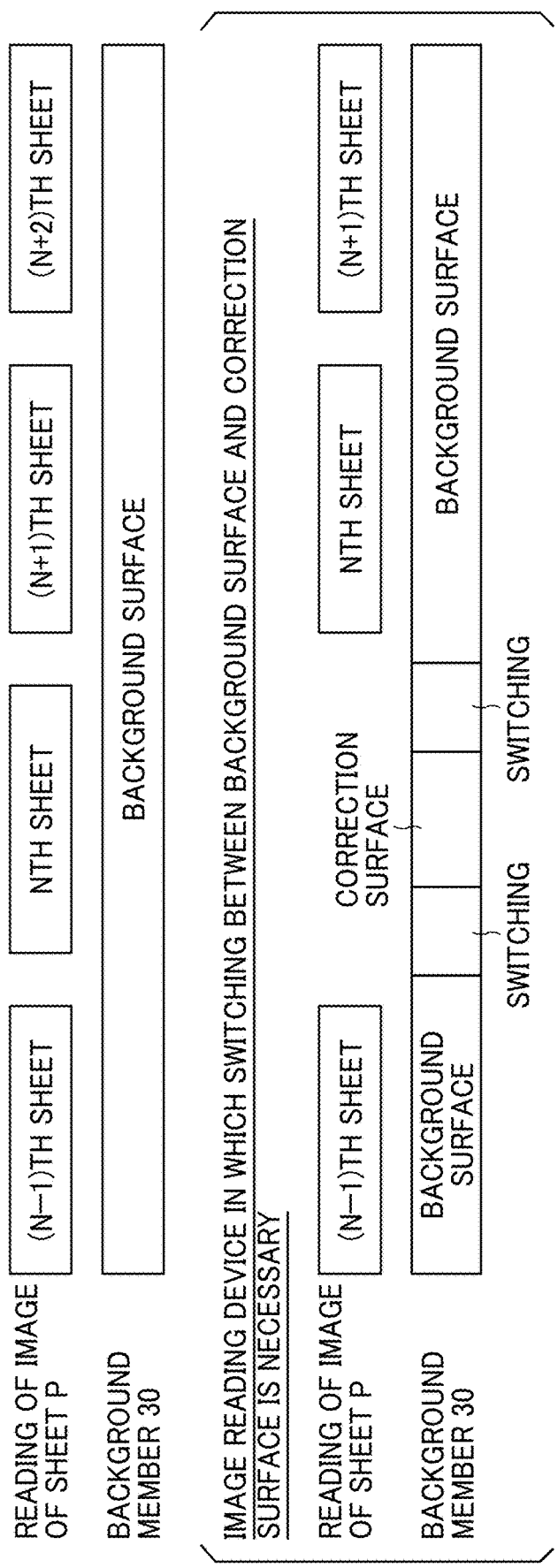
FIG. 5 is a diagram illustrating an example of a reading operation of visible images by the image reading device of FIG. 1.

FIG. 5 is a diagram illustrating an example of a visible-image reading operation performed by the image reading device 10 illustrated in FIG. 1. That is, FIG. 5 illustrates an example of an image reading method by the image reading device 10. The background surface of the background member 30 illustrated in FIG. 5 is a surface on which an invisible image is formed. The invisible mark IVMRK of the background member 30 illustrated in FIG. 1 always faces the light source 21 and the line sensor 22. Therefore, when the sheet P is not present in the passage area PA of FIG. 1, the line sensor 22 can always read the invisible mark IVMRK.

Accordingly, the reading unit 20 of FIG. 1 can determine the correction amount of the image characteristics used for correcting the visible image and the invisible image for each reading interval of the sheet P. That is, the reading time of the invisible mark IVMRK can be included in the reading operation period of continuous sheets P. The correction amount may be determined every time a plurality of sheets P are read or may be determined before the first sheet is read. The interval for determining the correction amount may be set shorter as the temperature is higher.

In the square brackets on the lower side of FIG. 5, an example is illustrated of the operation of the image reading device in which switching between the background surface and the correction surface is necessary. The background surface indicated in the correction member in the brackets indicates a surface used as a background in reading an image of the sheet P. A correction surface indicated by a correction member in brackets indicates a surface on which a correction pattern (an invisible image or a visible image) is formed.

In the image reading device that performs the operation in the brackets, for example, switching between the background surface and the correction surface is performed between reading of the (N−1)th sheet P and reading of the Nth sheet P. The visible image or the invisible image on the correction surface is used to determine the correction amount of the image characteristic.

In this case, the number of sheets P to be read per unit time decreases as the switching frequency between the background surface and the correction surface increases, and the reading efficiency of the sheets P decreases. In order to prevent a reduction in reading efficiency, it is preferable to reduce the frequency of reading the correction surface and reduce the frequency of determining the correction amount. In this case, the correction accuracy of the image decreases.

Figure 6:
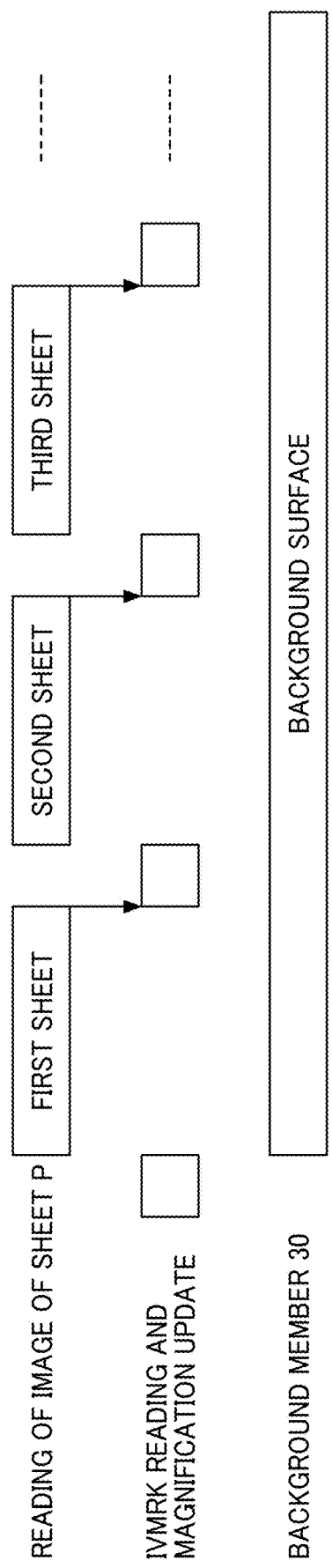
FIG. 6 is a diagram illustrating an example of timings of reading invisible marks and updating magnification by the image reading device of FIG. 1.

FIG. 6 is a diagram illustrating an example of timings of reading an invisible mark and updating a magnification by the image reading device 10 of FIG. 1. That is, FIG. 6 illustrates an example of an image reading method by the image reading device 10. FIG. 6 illustrates an operation of continuously reading a plurality of sheets P (image acquisition operation). In this case, the reading unit 20 of FIG. 1 reads the invisible marks IVMRK of the background member 30 before the first reading of the sheet P and at each reading interval of the sheet P, and determines the correction amount of the image characteristics of the visible image and the invisible image. The invisible mark IVMRK may be read every time a predetermined number of sheets P are read.

As a result, the reading unit 20 can periodically read the invisible mark IVMRK and update the magnification. In other words, the magnification can be periodically updated without decreasing the reading frequency of the sheet P. As a result, optimum correction can be constantly performed on the image read from the sheet P.

As described above, in the first embodiment, the image reading device 10 performs an operation of reading an image on the sheet P in a state in which the invisible mark IVMRK formed on the background member 30 constantly faces the passage area PA. Accordingly, the image reading device 10 can detect a change in the optical characteristics of the reading unit 20 based on the change rate of the interval between the invisible marks IVMRK at any timing when the sheet P is not present in the passage area PA. The image reading device 10 can determine the correction amount of the image characteristic used for correcting the image according to the detected change in the optical characteristic.

That is, the image reading device 10 can detect a change in image characteristics due to a change in optical characteristics of the reading unit and determine a correction amount of the image characteristics without reducing the number of images to be read. The image reading device 10 can periodically perform reading of the invisible mark IVMRK and update of the magnification, thus allowing optimum correction to be constantly performed on an image read from the sheet P.

Forming figures such as the invisible marks IVMRK on the background member 30 at predetermined intervals allows the image reading device 10 to detect a change in optical characteristics of the reading unit 20 based on the captured figures. Arranging the figures such as the invisible marks IVMRK on the background member 30 at equal intervals S allows the change rate (magnification) of the interval for each position in the main scanning direction to be obtained by a simple calculation.

The correction unit 50 determines the correction amount of the image characteristics used for correcting the visible image by using the change rate of the interval of the invisible marks IVMRK detected by the detection unit 40 as the change rate of the visible image. Accordingly, the calculation of the change rate of the interval between the visible images can be obviated, and the calculation processing of the correction unit 50 can be simplified. Thus, the time until the correction amount of the image characteristics is determined can be shortened.

Forming the background member 30 using glass or a ceramic material having a small temperature change can reduce a decrease in accuracy of correction of a visible image due to a temperature change.

Second Embodiment of Image Reading Device

Figure 7:
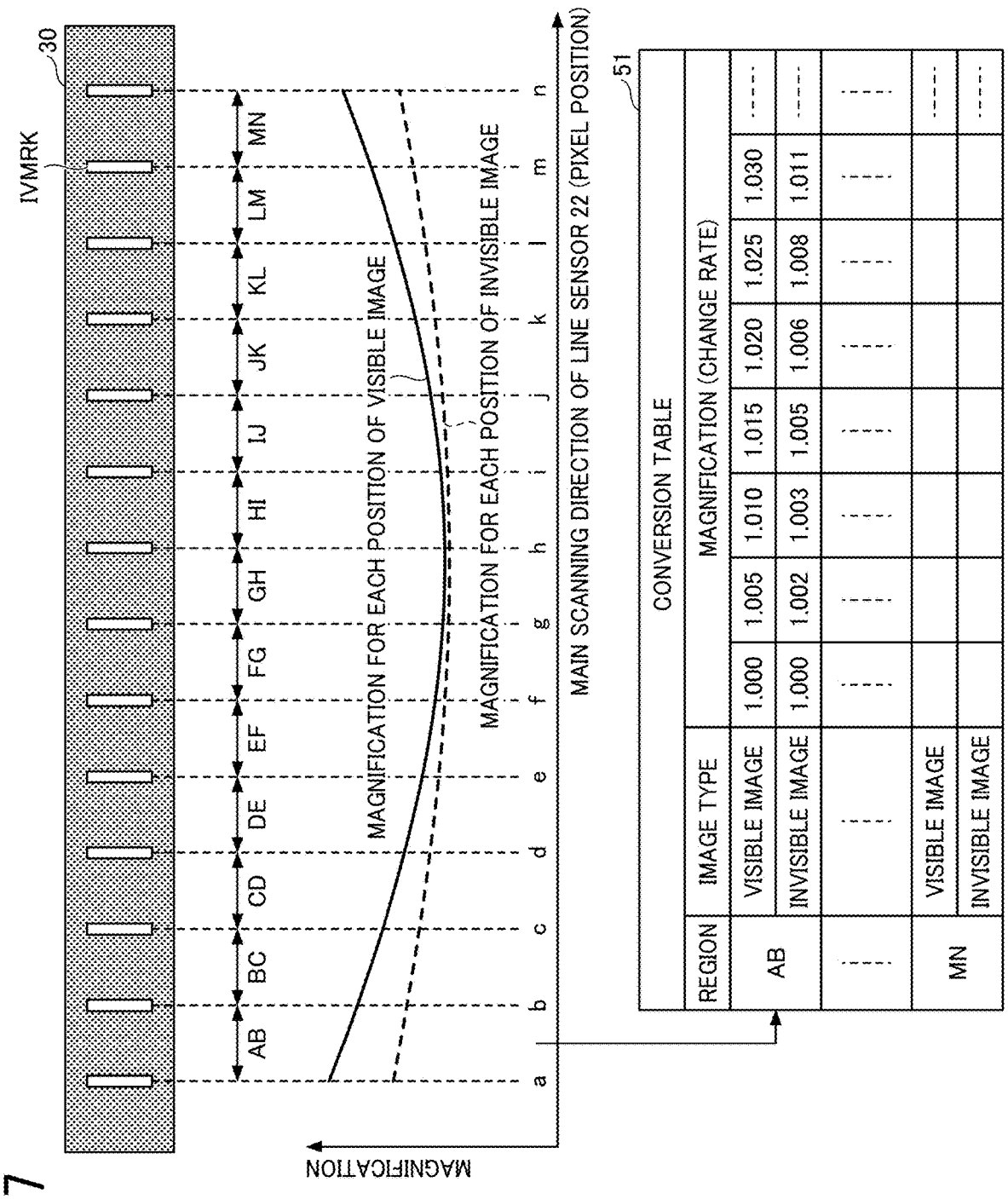
FIG. 7 is a diagram illustrating an example of correcting a visible image in an image reading device according to a second embodiment of the present disclosure.

FIG. 7 is a diagram illustrating an example of correcting a visible image in a semiconductor integrated circuit according to a second embodiment of the present disclosure. Elements similar to those described with reference to FIGS. 1 to 6 are denoted by the same reference numerals, and detailed description thereof may be omitted. In an image reading device 10 including a background member 30 illustrated in FIG. 7, the function of a correction unit 50 is different from the function of the correction unit 50 described with reference to FIGS. 1 to 6. Other functions of the image reading device 10 are similar to, even if not the same as, those described with reference to FIGS. 1 to 6.

The correction unit 50 according to the present embodiment has a conversion table 51 in which a magnification (change rate) of a visible image with respect to a magnification (change rate) of an invisible image is held for each of regions AB, . . . , and MN arranged along the main scanning direction. The conversion table 51 includes correspondences between a plurality of sets of magnifications (change rates) of invisible images and visible images for each region such as the region AB.

For example, the magnification of the region AB is a change rate represented by a ratio AB/S. The conversion table 51 is an example of a holder that holds the relation between the change rate and the correction amount of the image of the object in correspondence with each of a plurality of locations along the main scanning direction.

Normally, the amount of change in magnification (distortion) for each region in the main scanning direction is determined by the characteristics of the lens used and the wavelength of light. However, when one image reading device 10 reads a visible image and an invisible image using the same lens, the amount of change in magnification of the visible image can be uniquely associated with the amount of change in magnification of the invisible image as long as the wavelengths of the visible light and the invisible light do not change.

The correction unit 50 determines a correction amount for each pixel of the visible image obtained by reading the sheet P by referring to the conversion table 51 for each region such as the region AB and using the change rate of the visible image corresponding to the change rate of the invisible image corresponding to the invisible mark IVMRK. For example, when the change rate of the invisible image detected by the detection unit 40 is 1.005 times, the correction unit 50 uses the corresponding change rate of the visible image being equal to 1.015 times to determine the ratio 1/1.015 as the magnification used for correcting the visible image. As a result, the accuracy of correction can be enhanced as compared with the case where the change rate of the invisible image is used as it is to determine the magnification used for correction of the visible image.

As described above, also in this embodiment, similarly to the above-described embodiment, the image reading device 10 can detect a change in the optical characteristics of the reading unit 20 based on the change rate of the interval between the invisible marks IVMRK at any timing when the sheet P is not present in the passage area PA. The image reading device 10 can determine the correction amount of the image characteristic used for correcting the image according to the detected change in the optical characteristic.

Further, in this embodiment, the image reading device 10 includes the conversion table 51 in which the magnification of the invisible image and the magnification of the visible image are associated with each other for each region provided along the main scanning direction. Thus, the image reading device 10 can enhance the accuracy of the correction of the image on the sheet P compared to a case where the change rate of the invisible image is used as it is to determine the magnification used for the correction of the visible image.

Third Embodiment of Image Reading Device

Figure 8:
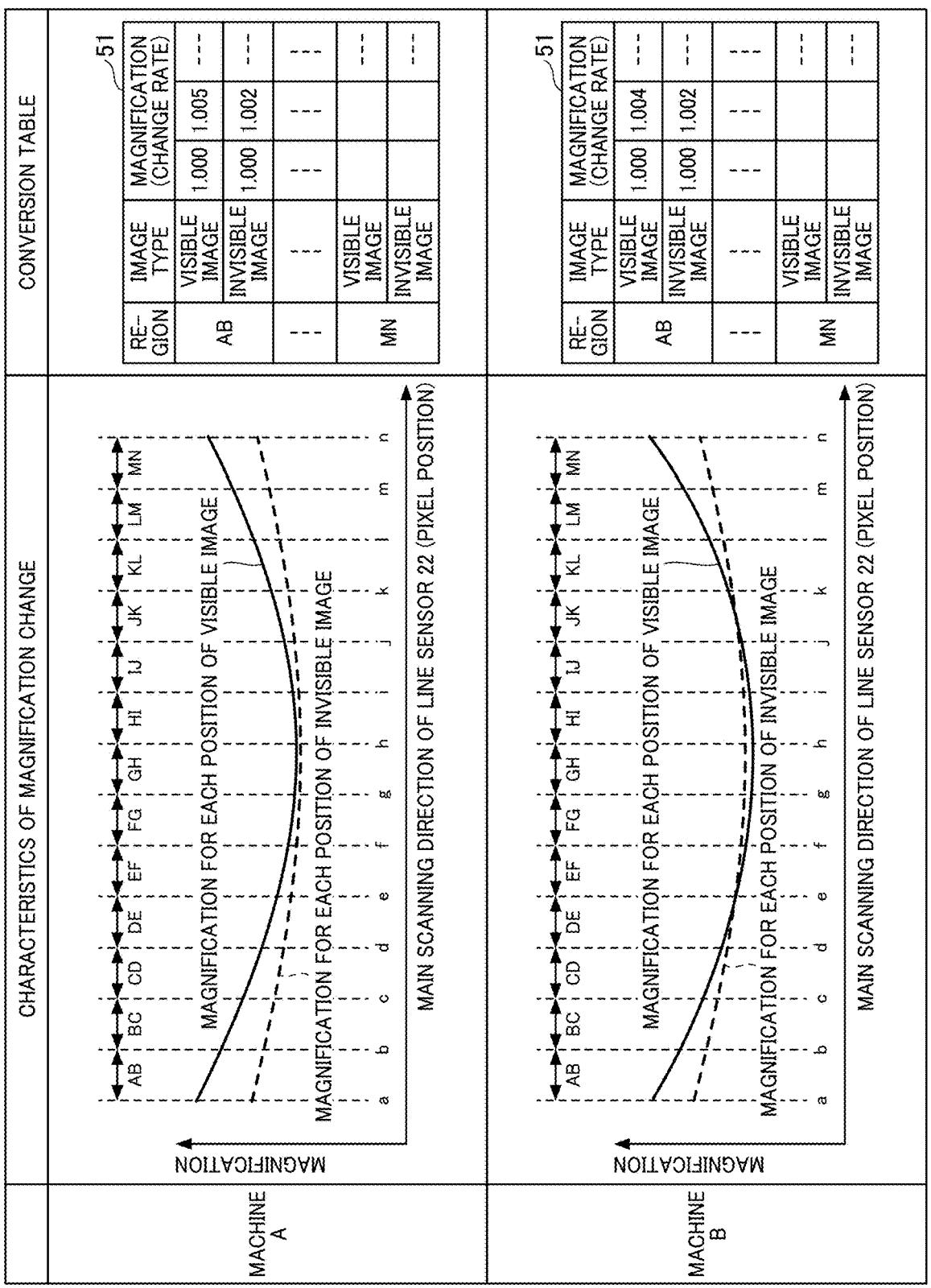
FIG. 8 is a diagram illustrating an example of correcting a visible image in an image reading device according to a third embodiment of the present disclosure.

FIG. 8 is a diagram illustrating an example of correcting a visible image in a semiconductor integrated circuit according to a third embodiment of the present disclosure. Elements similar to those described with reference to FIGS. 1 to 7 are denoted by the same reference numerals, and detailed description thereof may be omitted.

In this embodiment, a change in the optical characteristics of a reading unit 20 is evaluated in advance for each image reading device 10 (for example, for each of a machine A and a machine B), and a conversion table 51 set according to an evaluation result is held in a correction unit 50. The configuration and function of each image reading device 10 are the same as those of the image reading device 10 described with reference to FIG. 7. That is, the image reading device 10 according to this embodiment has the same functions as those of the image reading device 10 described with reference to FIGS. 1 to 6 except that the image reading device 10 has the function of the correction unit 50 described with reference to FIG. 7.

As described above, also in this embodiment, the same effects as those of the above-described embodiment can be obtained. Further, in this embodiment, the correction amount of the image can be determined according to the optical characteristics of the reading unit 20 for each individual image reading device 10.

Fourth Embodiment of Image Reading Device

Figure 9:
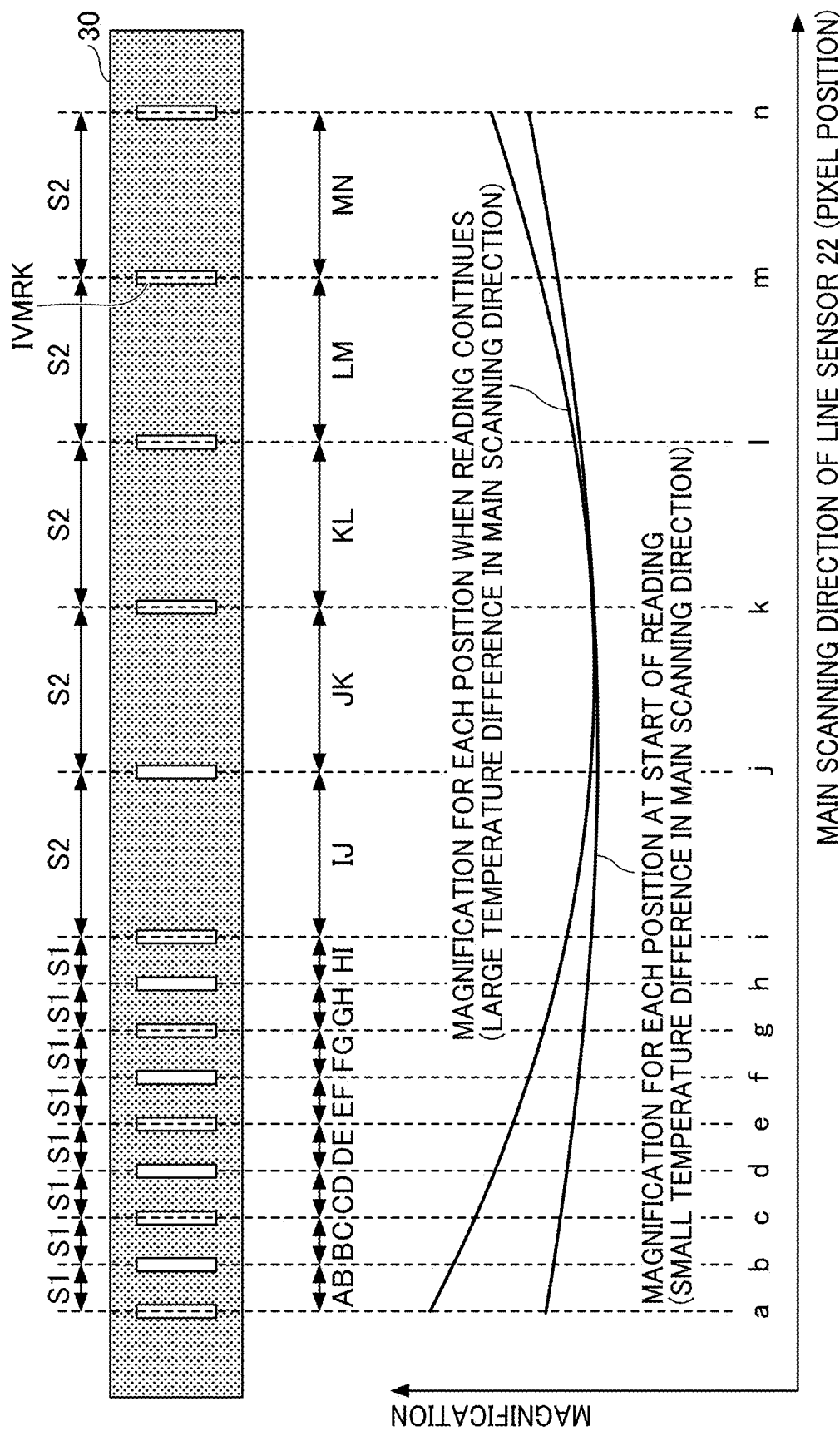
FIG. 9 is a diagram illustrating an example of correcting a visible image in an image reading device according to a fourth embodiment of the present disclosure.

FIG. 9 is a diagram illustrating an example of correcting a visible image in an image reading device according to a fourth embodiment of the present disclosure. Elements similar to those described with reference to FIGS. 1 to 6 are denoted by the same reference numerals, and detailed description thereof may be omitted. In an image reading device 10 according to the present embodiment, the interval of invisible marks IVMRK formed on a background member 30 is different from the interval of the invisible marks IVMRK formed on the background member 30 of FIG. 2.

Since there are a plurality of intervals between two invisible marks IVMRK, the pixel position at which the change rate is calculated by a detection unit 40 is different from the pixel position in FIG. 4. Here, the change rate is the ratio of an inherent interval S1 (or S2) of two invisible marks IVMRK and an interval of two invisible marks IVMRK. In this embodiment, the pixel position to which the magnification used for image correction by a correction unit 50 is applied is set in accordance with the position of the interval between two invisible marks IVMRK. Other configurations and functions of the image reading device 10 are the same as those of the image reading device 10 illustrated in FIGS. 1 to 6.

In the example illustrated in FIG. 9, the temperature change is larger toward the left end of FIG. 9, and is smaller toward the right end of FIG. 9. As illustrated in FIG. 9, at a position where the temperature change is large in the main scanning direction, the change in magnification is larger than at a position where the temperature change is small. For this reason, in order to accurately detect the change rate and accurately determine the magnification for correcting the visible image, in this embodiment, the interval between invisible marks IVMRK is set to be smaller at the position in the main scanning direction where the temperature change is large than at the position in the main scanning direction where the temperature change is small.

For example, in FIG. 9, in the regions AB, BC, CD, DE, EF, PG, GH, and HI where the temperature change is relatively large, the interval between two invisible marks IVMRK is set to S1. In the large regions IJ, JK, KL, LM, and MN in which the temperature change is relatively small, the interval between two invisible marks IVMRK is set to the interval S2 larger than the interval S1. In FIG. 9, there are two types of intervals, S1 and S2, but there may be three or more types of intervals.

Such a configuration can detect the change rate for each fine region at a position where the temperature change is large where the change in magnification is large, and change the correction amount (magnification). Thus, the accuracy of image correction for each position in the main scanning direction can be enhanced. The correction unit 50 mounted on the image reading device 10 illustrated in FIG. 9 may have the conversion table 51 as in FIG. 7. The correction unit 50 may determine the correction amount for each pixel of the visible image obtained by reading the sheet P using the change rate of the visible image held in correspondence with the change rate of the invisible image corresponding to the invisible mark IVMRK for each region.

As described above, also in this embodiment, the same effects as those of the above-described embodiment can be obtained. Further, in this embodiment, the interval of the invisible marks IVMRK in the region where the temperature change is large is set to be smaller, thus enhancing the accuracy of image correction for each position in the main scanning direction.

Fifth Embodiment of Image Reading Device

Figure 10:
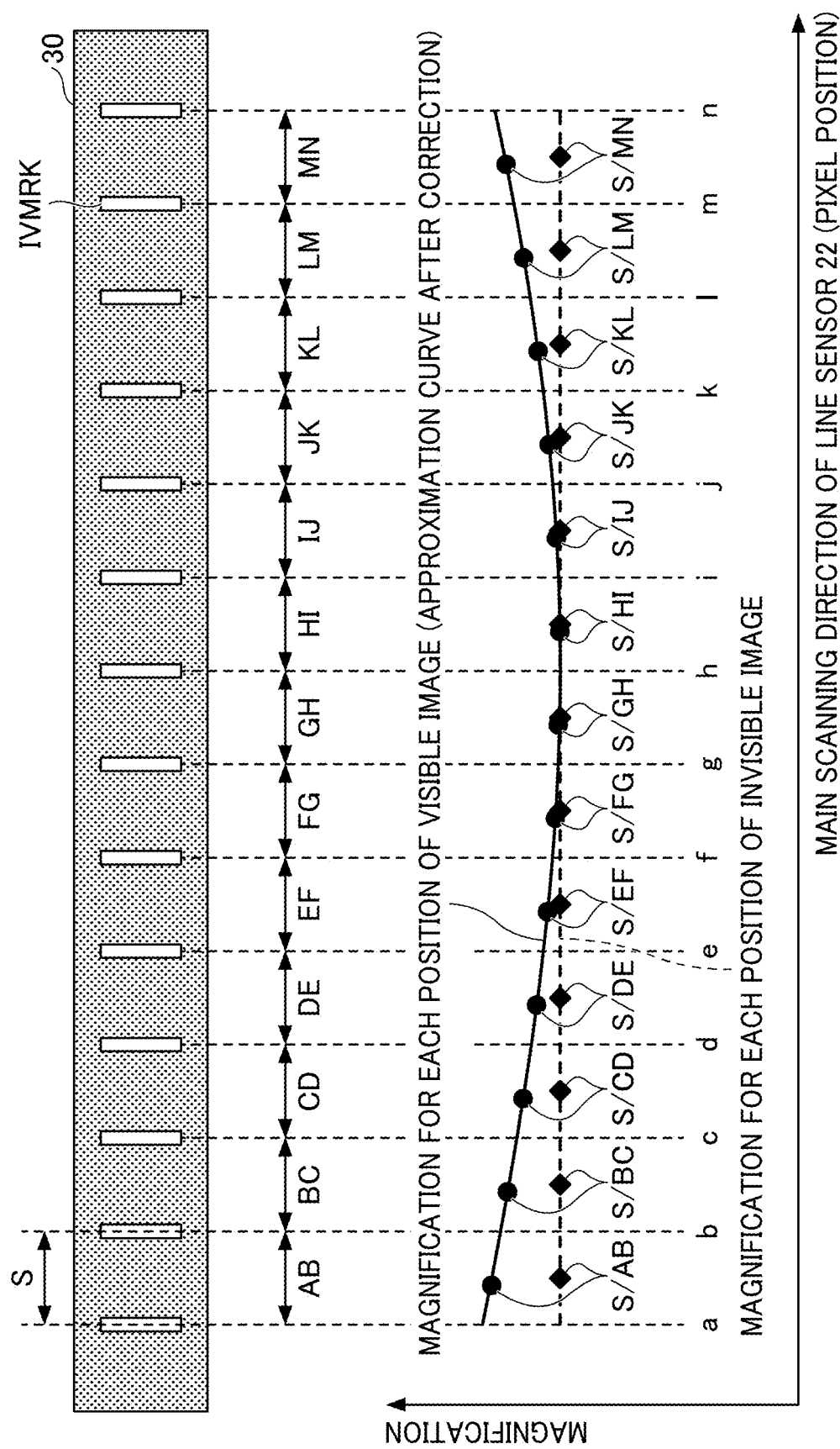
FIG. 10 is a diagram illustrating an example of correcting a visible image in an image reading device according to a fifth embodiment of the present disclosure.

FIG. 10 is a diagram illustrating an example of correcting a visible image in an image reading device according to a fifth embodiment of the present disclosure. In an image reading device 10 including a background member 30 illustrated in FIG. 10, the function of a correction unit 50 is different from the function of the correction unit 50 described with reference to FIGS. 1 to 6. Other functions of the image reading device 10 are similar to, even if not the same as, those described with reference to FIGS. 1 to 6.

The correction unit 50 according to the present embodiment derives an approximate line (approximate curve in the example of FIG. 10) by interpolating the magnification (correction amount) of a pixel position where no invisible mark IVMRK is disposed, based on the change rate (for example, AB/S) calculated by a detection unit 40. For example, in a case where the magnification is determined using the same change rate for each predetermined region (for example, a region AB or BC), there is a concern that an image may be left uncorrected or overcorrected. Deriving the approximate line can reduce the possibility of overcorrection or insufficient correction, and enhance the accuracy of correction of the image on the sheet P.

The correction unit 50 mounted on the image reading device 10 illustrated in FIG. 10 may have the conversion table 51 as in FIG. 7. In this case, the correction unit 50 derives an approximate line of the change rate based on the change rate calculated for each region by the detection unit 40, and determines the magnification of the visible image for each pixel position with reference to the conversion table 51. The derivation of the approximate line of the change rate may be performed by the detection unit 40.

As described above, also in this embodiment, the same effects as those of the above-described embodiment can be obtained. Further, in this embodiment, the approximate line is derived by interpolating the magnification (correction amount) of the pixel position. Accordingly, the possibility of overcorrection or insufficient correction can be reduced, and the accuracy of correction of the image of the sheet P can be further enhanced.

Sixth Embodiment of Image Reading Device

Figure 11:
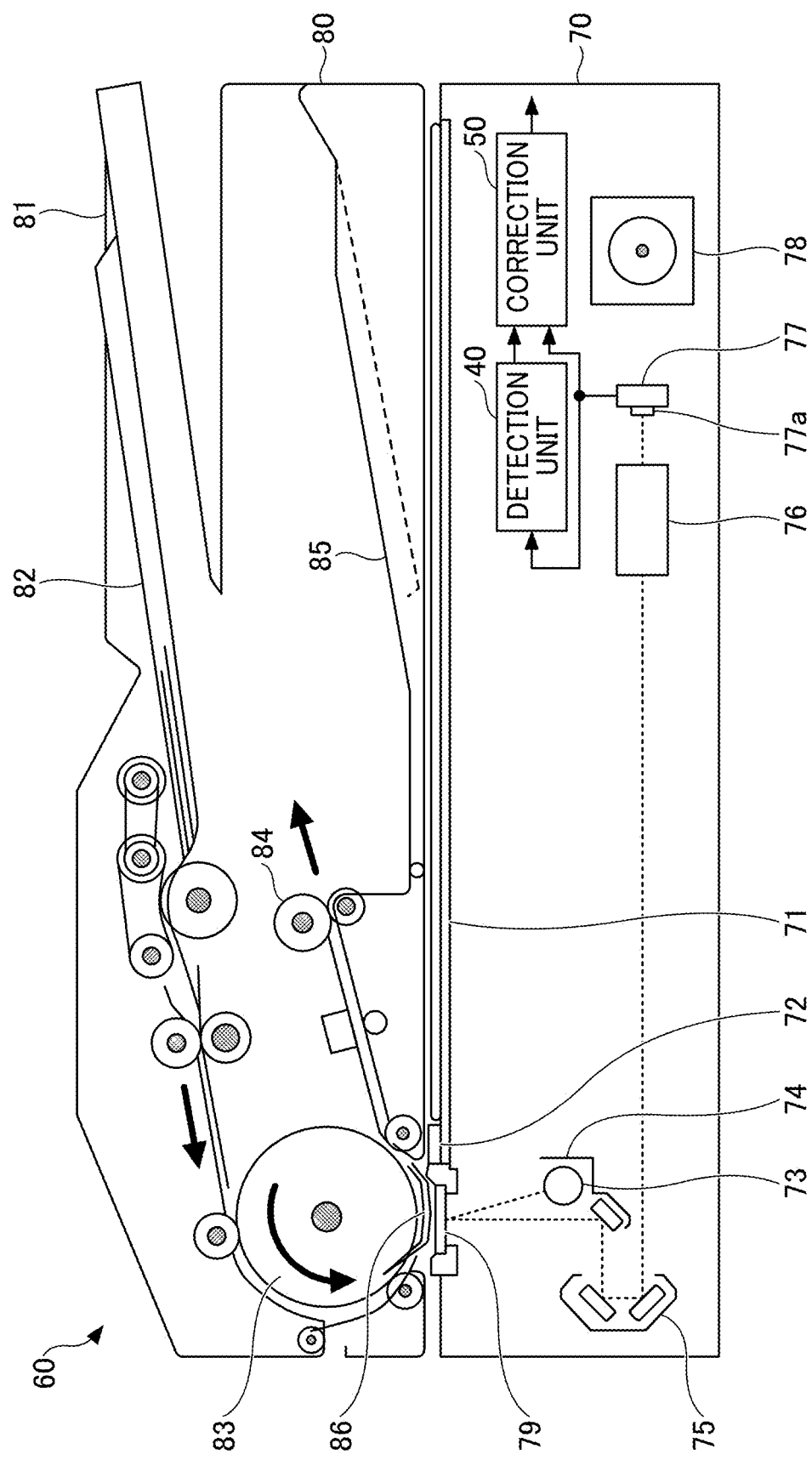
FIG. 11 is a side view of an image reading device according to a sixth embodiment of the present disclosure.

FIG. 11 is a side view of an image reading device according to a sixth embodiment of the present disclosure. Elements and functions similar to those of the above-described embodiment are not described below in detail. An image reading device 60 illustrated in FIG. 11 includes a reading unit 70 and an auto document feeder (ADF) unit 80, and is a so-called sheet-through type document reading apparatus.

The reading unit 70 includes an exposure glass 71, a reference white plate 72, a light source 73, a first carriage 74, a second carriage 75, a lens 76, a sensor board 77 including a line sensor 77*a*, a scanner motor 78, and a reading window 79. The reading unit 70 includes the detection unit 40 and the correction unit 50 illustrated in FIG. 1. The ADF unit 80 includes a document tray 81 on which a document 82 is placed, a conveyance drum 83, sheet ejection rollers 84, a sheet ejection tray 85, and a background member 86.

On the background member 86, similarly to the background member 30 of FIG. 1, a plurality of invisible marks IVMRK are formed at intervals along a scanning direction (the depth direction of FIG. 11) of the line sensor 77*a*. Invisible marks IVMRK are formed on a surface of the background member 86 facing the light source 73. The background member 86 also serves as a pressing member that presses a document 82 against the reading window 79 when the document 82 is conveyed to the reading window 79 by the ADF unit 80.

The line sensor 77*a* is, for example, a charge-coupled device (CCD) image sensor or a complementary metal-oxide semiconductor (CMOS) image sensor. The line sensor 77*a* reads at least one of a visible image and an invisible image on the document 82 and outputs the read image to the correction unit 50. The line sensor 77*a* reads the invisible marks IVMRK on the background member 86 and outputs the read image to the detection unit 40 and the correction unit 50 as an invisible image. The detection unit 40 and the correction unit 50 have the detection function and the correction function according to any of the above-described embodiments.

The ADF unit 80 has a function of automatically feeding documents 82 whose images are to be read one by one to the conveyance drum 83 and conveying the documents 82 toward the reading window 79. The document 82 conveyed to the reading window 79 is irradiated with light by the light source 73 when passing through the reading window 79. The reflection light of the light from the document is reflected by the mirror of the first carriage 74 and the mirror of the second carriage 75, passes through the lens 76, and is reduced and imaged on the light receiving surface of the line sensor 77*a* on the sensor board 77.

In flatbed reading in which the image reading device 60 reads an image of the document 82 placed on the exposure glass 71, the scanner motor 78 moves the light source 73, the first carriage 74, and the second carriage 75 in the horizontal direction in FIG. 1I. The document 82 on the exposure glass 71 is irradiated with light by the light source 73 that moves below the exposure glass 71, and reflected light from the document 82 is turned back by the mirrors of the first carriage 74 and the second carriage 75 that move in conjunction with the movement of the light source 73.

The reflection light passes through the lens 76 and is reduced and imaged on the light receiving surface of the line sensor 77*a* on the sensor board 77. At this time, the first carriage 74 moves at a speed V. The second carriage 75 moves at ½ V, which is half the speed of the first carriage 74, in conjunction with the movement of the first carriage 74. Thus, the image reading device 60 reads the entire image of the document 82. In the reading unit 70 illustrated in FIG. 11, the first carriage 74 and the second carriage 75 including mirrors, the lens 76, and the sensor board 77 are separately configured. However, in some embodiments, an integrated sensor module in which those components are integrated may be used.

As described above, also in this embodiment, the same effects as those of the above-described embodiment can be obtained. For example, the image reading device 10 can detect a change in the optical characteristics of the reading unit 20 based on the change rate of the interval between the invisible marks IVMRK at any timing when the sheet P is not present in the passage area PA. The image reading device 10 can determine the correction amount of the image according to the detected change in the optical characteristic.

First Embodiment of Image Forming Apparatus

Figure 12:
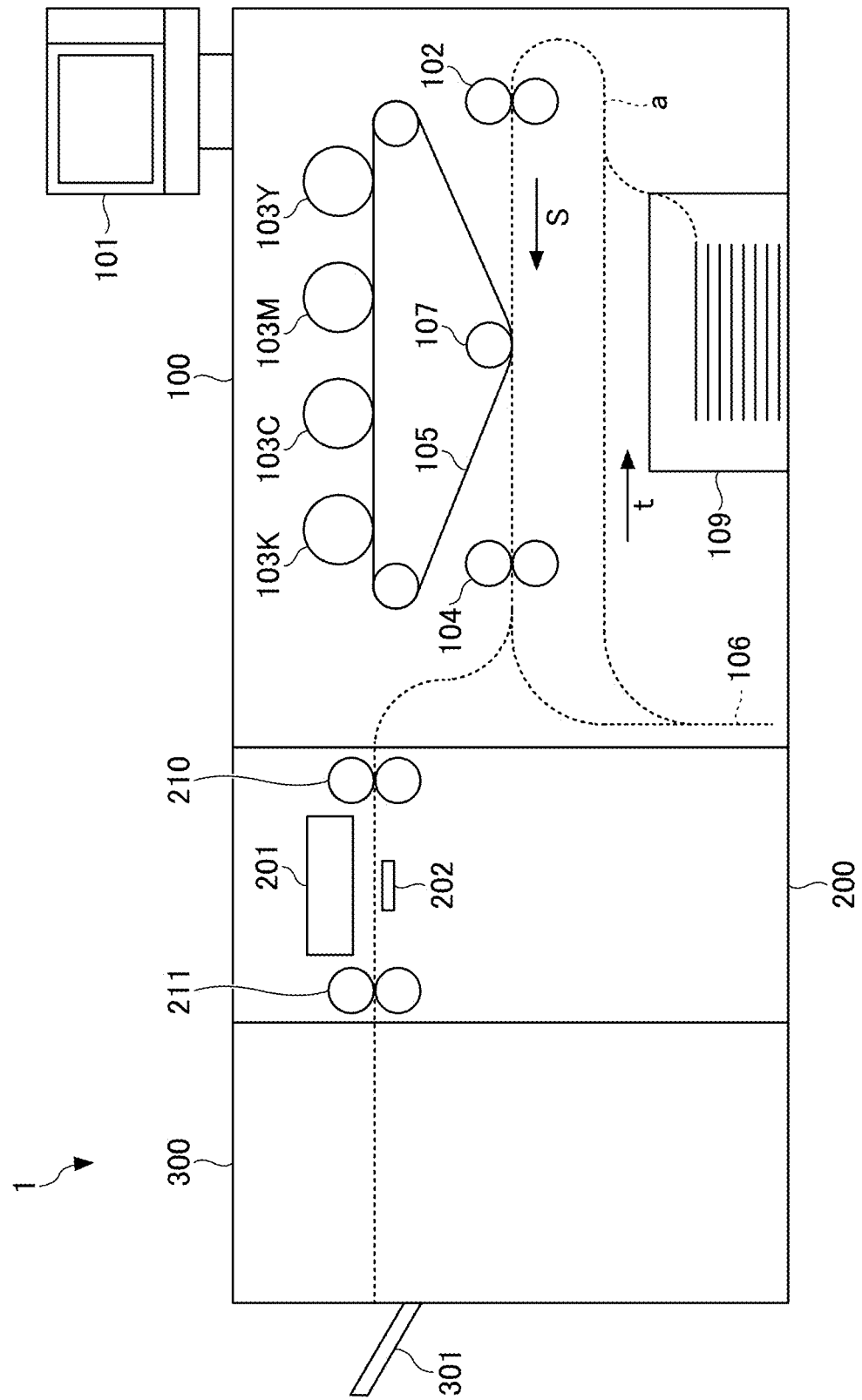
FIG. 12 is a side view of an image forming apparatus according to a first embodiment of the present disclosure.

FIG. 12 is a side view illustrating an image forming apparatus according to a first embodiment of the present disclosure. In FIG. 12, the inside of the image forming apparatus is transparently illustrated for ease of understanding. Elements and functions similar to those of the above-described embodiment are not described below in detail. An image forming apparatus 1 illustrated in FIG. 12 functions as a printing system including a printing apparatus such as a commercial printing machine (production printing machine) that continuously prints a large number of sheets in a short time. Note that the image forming apparatus 1 according to the present embodiment may be a printing apparatus other than a commercial printing machine.

An image forming apparatus 1 serving as a printing system includes a printing apparatus 100, an inspection apparatus 200, and a stacker 300. The printing apparatus 10N includes an operation panel 101, tandem electrophotographic image forming units 103Y, 103M, 103C, and 103K, a transfer belt 105, a secondary transfer roller 107, a sheet feeding unit 109, a conveyance roller pair 102, a fixing roller 104, and a reverse path 106.

The operation panel 101 receives various operations for the printing apparatus 100 and the inspection apparatus 200 based on operations by an operator of the image forming apparatus 1. The operation panel 101 displays various screens indicating an operation state and the like of the image forming apparatus 1.

In each of the image forming units 103Y, 103M, 103C, and 103K, an image forming process is performed to form a toner image, and the formed toner image is transferred to the transfer belt 105. For example, the image forming process includes a charging step, an exposure step, a developing step, a transfer step, and a cleaning step. For example, a yellow toner image is formed on the image forming unit 103Y, and a magenta toner image is formed on the image forming unit 103M. A cyan toner image is formed on the image forming unit 103C, and a black toner image is formed on the image forming unit 103K. However, the types of image forming units are not limited to four colors.

The transfer belt 105 conveys toner images (full-color toner images) superimposed and transferred from the image forming units 103Y, 103M, 103C, and 103K to a secondary transfer position of the secondary transfer roller 107. For example, a yellow toner image is first transferred onto the transfer belt 105, and then a magenta toner image, a cyan toner image, and a black toner image are sequentially superimposed and transferred onto the transfer belt 105. However, the transfer order of the toner images is not limited to the above-described order.

The sheet feeding unit 109 stores a plurality of recording media to be processed (conveyed objects) in a stacked manner, and feeds the recording media toward the conveyance roller pair 102. The recording medium is, for example, a recording sheet (transfer sheet). However, the recording medium may be any other medium capable of recording an image, such as coated paper, thick paper, an overhead projector (OHP), a plastic film, a prepreg, and a copper foil.

The conveyance roller pair 102 conveys a recording medium fed by the sheet feeding unit 109 in a direction indicated by arrow s on a conveyance path a. The secondary transfer roller 107 collectively transfers the full-color toner images conveyed by the transfer belt 105 onto the recording medium conveyed by the conveyance roller pair 102 at a secondary transfer position.

The fixing roller 104 heats and presses the recording medium onto which the full-color toner images have been transferred, thereby fixing the full-color toner image onto the recording medium. In the case of single-sided printing, the printing apparatus 100 sends a printed matter, which is the recording medium on which the full-color toner images are fixed, to the inspection apparatus 200. On the other hand, in the case of double-sided printing, the printing apparatus 100 sends the recording medium, on which the full-color toner images have been fixed, to a reverse path 106.

The reverse path 106 switches back the sent recording medium, thereby reversing the front surface and the back surface of the recording medium and conveying the recording medium in a direction of arrow t in FIG. 12. The recording medium conveyed by the reverse path 106 is conveyed again in a direction of arrow s by a conveyance roller pair 102. Full-color toner images are transferred by the secondary transfer roller 107 onto the back surface of the recording medium that has been reversed through the reverse path 106. The toner images transferred onto the recording medium are fixed by the fixing roller 104, and the recording medium is sent to the inspection apparatus 200 and the stacker 300 as a printed matter.

The inspection apparatus 200 located downstream from the printing apparatus 100 in the direction of conveyance of the recording medium has a reading device 201 and a density reference member 202. The density reference member 202 is, for example, a white plate and is used as a reference of a reading level of the reading device 201. The inspection apparatus 200 also includes conveyance roller pairs 210 and 211 constituting part of the conveyance path a to convey the recording medium sent from the printing apparatus 100 to the stacker 300. The density reference member 202 is disposed between the conveyance roller pair 210 and the conveyance roller pair 211.

The reading device 201 receives reflected light from a reading object and outputs the reflected light as an image signal. For example, the reading device 201 reads a color pattern on a recording medium sent from the printing apparatus 100 or color patches arranged in the inspection apparatus 200. The reading device 201 also reads the density reference member 202.

The inspection apparatus 200 ejects the recording medium whose reading has been completed to the stacker 300. The stacker 300 has a tray 301. The stacker 3M) stacks recording media ejected by the inspection apparatus 200 on the tray 301.

Figure 13:
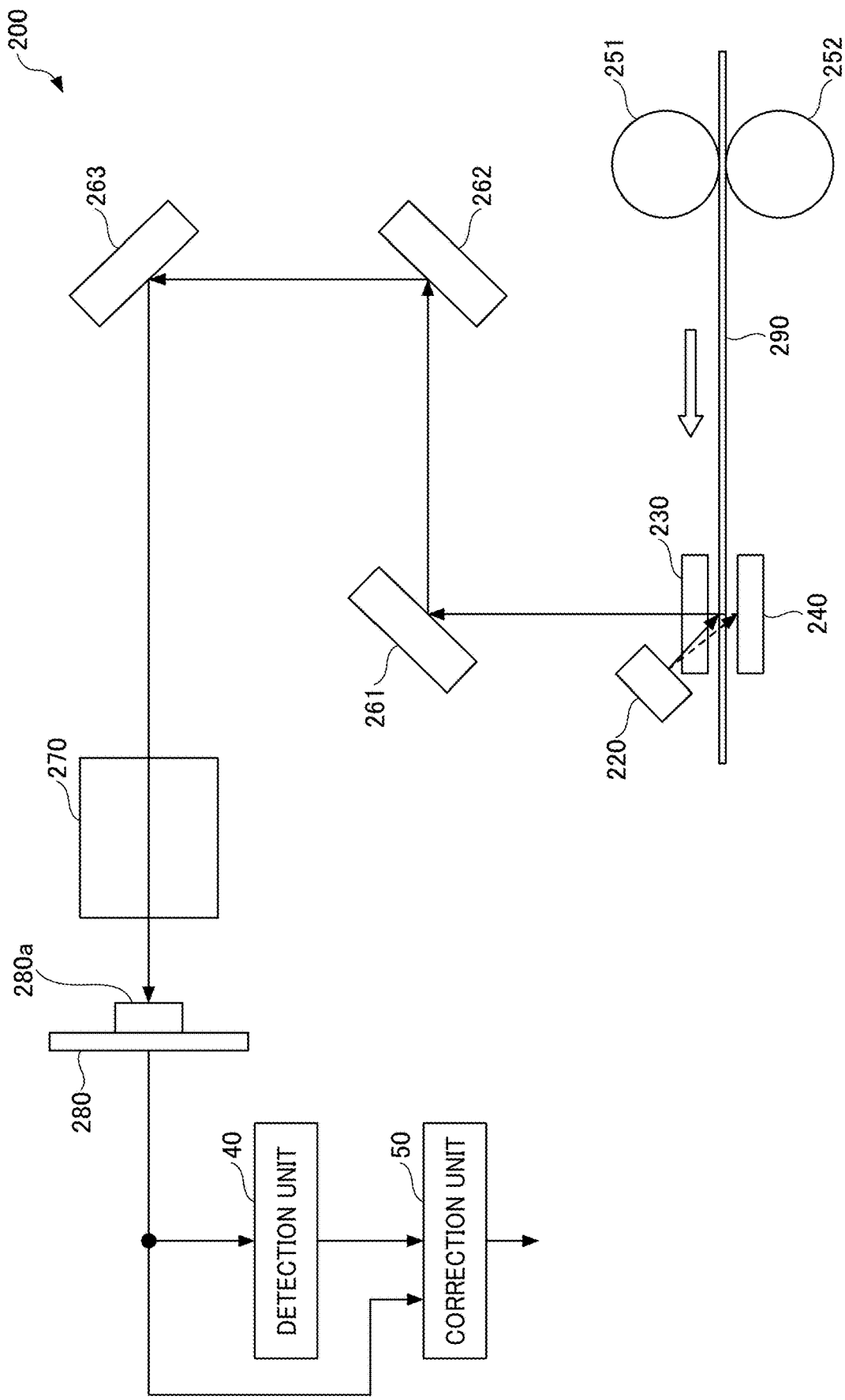
FIG. 13 is a side view illustrating an example of a main part of an inspection apparatus illustrated in FIG. 12.

FIG. 13 is a side view illustrating an example of a main part of the inspection apparatus 200 of FIG. 12. In FIG. 13, the inside of the inspection apparatus 200 is transparently illustrated for easy understanding of the description. The inspection apparatus 200 includes a light source 220, an exposure glass 230, a background member 240, conveyance rollers 251 and 252, reflection mirrors 261, 262, and 263, a lens unit 270, a sensor board 280 including a line sensor 280a, a detection unit 40, and a correction unit 50. Some of the elements illustrated in FIG. 13 may be included in the reading device 201 of FIG. 2.

For example, the light source 220, the exposure glass 230, the background member 240, and the line sensor 280a correspond to the light source 21, the passage area PA, the background member 30, and the line sensor 22 in FIG. 1. The light source 220, the exposure glass 230, the background member 240, the conveyance rollers 251 and 252, and the reflecting mirrors 261, 262, and 263 correspond to the light source 73, the reading window 79, the background member 86, the conveyance drum 83, and the reflecting mirrors of the first and second carriages 74 and 75 in FIG. 11. The lens unit 270 and the sensor board 280 with the line sensor 280a correspond to the lens 76 and the sensor board 77 with the line sensor 77a of FIG. 11.

The light source 220 irradiates a recording medium 290 sent from the printing apparatus 100 or the background member 240 with light via the exposure glass 230. The background member 240 has a plurality of invisible marks IVMRK similar to those in FIG. 2. The reflecting mirrors 261, 262, and 263 guide reflected light from the recording medium 290 or the background member 240 to the lens unit 270. The lens unit 270 forms an image of the reflection light on the line sensor 280a.

The line sensor 280a is, for example, a CCD image sensor or a CMOS image sensor. The line sensor 280a reads at least one of a visible image and an invisible image on the recording medium 290 and outputs the read image to the correction unit 50. The line sensor 280a reads the invisible marks IVMRK on the background member 240 and outputs the read image to the detection unit 40 and the correction unit 50 as an invisible image. The detection unit 40 and the correction unit 50 have the detection function and the correction function according to any of the above-described embodiments.

The inspection apparatus 200 detects the presence or absence of an abnormality in an image formed on the recording medium 290 sent from the printing apparatus 100, and feeds back the abnormality to an image forming section such as an image forming unit of the printing apparatus 100. Further, in this embodiment, the inspection apparatus 200 calculates a change rate of the invisible mark IVMRK of the background member 240, and feeds back a magnification (correction amount of image characteristics) which is an inverse number of the calculated change rate to the printing apparatus 100. Based on the fed-back information, the printing apparatus 100 corrects the image formation position and corrects the image formation magnification.

As described above this embodiment can also exert effects similar to those of the above-described embodiment of the image reading device. Further, in this embodiment, the image printed on the recording medium 290 by the printing apparatus 100 can be corrected based on the magnification (correction amount) determined based on the invisible marks IVMRK read by the inspection apparatus 200. In other words, the accuracy of an image printed by the printing apparatus 100 can be enhanced.

Aspects of the present disclosure are described based on the above-described embodiments, but the present disclosure are not limited to the elements of the above-described embodiments. Any one of the above-described operations may be performed in various other ways, for example, in an order different from the one described above.

For example, in the above-described embodiments, examples have been described in which the line-shaped invisible marks IVMRK extending in the direction orthogonal to the main scanning direction are formed on the background member 30. However, the shape of the invisible mark IVMRK may be another shape as long as a change in the interval between two invisible mark IVMRK is detectable. The detection unit 40 may detect the size (area) of the invisible mark IVMRK instead of detecting the change in the interval between two invisible marks IVMRK.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image reading device, comprising:
a reading unit including:
a light source to emit light to a passage area through which an object passes; and
an imager to capture reflected light of the light emitted from the light source to generate a visible image and an invisible image;
a background disposed opposite the light source across the passage area, the background having invisible marks identifiable as invisible images by the imager; and
processing circuitry configured to:
detect a change in an image characteristic due to a change in an optical characteristic of the reading unit, in the invisible images obtained by capturing of the invisible marks;
determine a correction amount to be used for correcting an image of the object generated by the imager, based on the change in the image characteristic detected; and
correct the image characteristic based on the correction amount determined.

2. The image reading device according to claim 1, wherein the imager includes a plurality of pixels arranged in one direction, and
wherein the invisible marks are figures arranged at a predetermined interval in the one direction on the background.

3. The image reading device according to claim 2, wherein the processing circuitry detects, as the change in the image characteristic, a change rate of an interval between the invisible images with respect to the interval between the invisible marks at the predetermined interval arranged in the one direction.

4. The image reading device according to claim 3, wherein the processing circuitry uses the change rate to determine the correction amount to be used for correcting the image of the object generated by the imager.

5. The image reading device according to claim 3, further comprising a holder to hold a relation between the change rate and the correction amount of the image of the object, in correspondence with each of a plurality of positions in the one direction,
wherein the processing circuitry uses the correction amount held in the holder in correspondence with the change rate for each of the plurality of positions, to determine the correction amount used for correcting each pixel of the image of the object.

6. The image reading device according to claim 3, wherein the predetermined interval between the invisible marks is smaller at a position where a temperature change is larger in the background than at a position where a temperature change is smaller in the background.

7. The image reading device according to claim 3, wherein the processing circuitry interpolates a correction amount at a position where the invisible marks are not present on the background, based on the change rate corresponding to each of the invisible marks.

8. The image reading device according to claim 3, wherein the change rate is set for each image reading device.

9. The image reading device according to claim 1, wherein detection of the change in the image characteristic by the processing circuitry, determination of the correction amount by the processing circuitry, and correction of the image characteristic by the processing circuitry are performed before the image of the object is obtained by the reading unit, and are further performed every time a predetermined number of images of the object are obtained by the reading unit when a plurality of images of the object are continuously obtained by the reading unit.

10. The image reading device according to claim 1, wherein the background is made of glass or a ceramic material.

11. An image forming apparatus comprising the image reading device according to claim 1.

12. An image reading method, comprising:
emitting light from a light source to a passage area;
capturing reflected light of the light which was emitted to generate a visible image and an invisible image;

detecting a change in an image characteristic due to a change in an optical characteristic of an image reader in invisible images obtained by capturing invisible marks of a background;

determining a correction amount to be used for correcting a generated image generated by the capturing, based on the change in the image characteristic detected; and correcting the image characteristic based on the correction amount which has been determined.

13. The method according to claim 12, wherein the capturing captures using a plurality of pixels arranged in one direction, and wherein the invisible marks are figures arranged at a predetermined interval in the one direction on the background.

14. The method according to claim 13, further comprising:

detecting, as the change in the image characteristic, a change rate of an interval between the invisible images with respect to the predetermined interval between the invisible marks arranged in the one direction.

15. The method according to claim 14, wherein:

the determining uses the change rate to determine the correction amount.

16. The method according to claim 14, wherein:

the determining the correction amount used for correcting each pixel of the image of the object uses a correction amount of the image of the object in correspondence with the change rate for each of the plurality of positions in the one direction.

17. The method according to claim 14, wherein:

the predetermined interval between the invisible marks is smaller at a position where a temperature change is larger in the background than at a position where a temperature change is smaller in the background.

18. The method according to claim 14, further comprising:

interpolating a correction amount at a position where the invisible marks are not present on the background, based on the change rate corresponding to each of the invisible marks.

19. An image reading device, comprising:

a reading unit including:
- a light source to emit light to a passage area through which an object passes; and
- an imager to capture reflected light of the light emitted from the light source to generate a visible image and an invisible image;
- a background disposed opposite the light source across the passage area, the background having invisible marks identifiable as invisible images by the imager;

means for detecting a change in an image characteristic due to a change in an optical characteristic of the reading unit, in the invisible images obtained by capturing of the invisible marks;

means for determining a correction amount to be used for correcting an image of the object generated by the imager, based on the change in the image characteristic detected; and means for correcting the image characteristic based on the correction amount determined.

* * * * *